(12) United States Patent
Gey et al.

(10) Patent No.: US 9,463,531 B2
(45) Date of Patent: Oct. 11, 2016

(54) THREE-DIMENSIONAL SURFACE SHAPING OF ROTARY CUTTING TOOL EDGES WITH LASERS

(75) Inventors: Christoph Gey, Fürth (DE); Karthik Sampath, Pittsburgh, PA (US); Fabian Rosenberger, Fürth (DE); Stephen George, Greensboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 1266 days.

(21) Appl. No.: 12/604,752

(22) Filed: Oct. 23, 2009

(65) Prior Publication Data

US 2011/0097162 A1    Apr. 28, 2011

(51) Int. Cl.
*B23K 26/28* (2014.01)
*B23K 26/38* (2014.01)

(52) U.S. Cl.
CPC ......... *B23K 26/38* (2013.01); *B23K 2201/002* (2013.01); *Y10T 407/19* (2015.01)

(58) Field of Classification Search
CPC .. B23B 2200/28; B21K 11/00; B23K 26/362
USPC ............ 407/30; 219/121.72, 121.66, 121.67, 219/121.85; 82/1.11; 76/104.1
See application file for complete search history.

(56) References Cited

U.S. PATENT DOCUMENTS

| | | | |
|---|---|---|---|
| 4,229,640 A | 10/1980 | Castellani Longo | |
| 4,459,458 A | 7/1984 | Vetsch et al. | |
| 4,481,016 A | 11/1984 | Campbell et al. | |
| 4,714,385 A | 12/1987 | Komanduri | |
| 4,755,237 A * | 7/1988 | Lemelson | 148/512 |
| 4,797,138 A | 1/1989 | Komanduri | |
| 4,849,602 A | 7/1989 | Gardner | |
| 4,987,800 A | 1/1991 | Gasan et al. | |
| 5,022,801 A | 6/1991 | Anthony et al. | |
| 5,026,960 A | 6/1991 | Slutz et al. | |
| 5,160,824 A | 11/1992 | Babel | |
| 5,178,645 A * | 1/1993 | Nakamura et al. | 51/293 |

(Continued)

FOREIGN PATENT DOCUMENTS

CN    1689739 A    11/2005
DE    198 60 585 A1    7/2000

(Continued)

OTHER PUBLICATIONS

International Search Report for PCT International Patent Application Serial No. PCT/US2010/053362; Jul. 26, 2011; 3 pages.

(Continued)

*Primary Examiner* — Will Fridie, Jr.
(74) *Attorney, Agent, or Firm* — Matthew S. Bedsole

(57) ABSTRACT

A method for forming the cutting edge and adjacent contoured surface area of rotary cutting tools utilizing a laser to remove material from the cutting end of the tool to create a predetermined point-by-point geometry is disclosed. Relatively complex surface and edge geometries may be formed by directing a laser beam toward the cutting end of the tool at an angle having a component that is normal to the surface of the cutting end. The laser beam is directed in multiple passes across the surface of the cutting end to remove material and form the desired cutting edge and adjacent three-dimensional contoured surface geometry.

27 Claims, 4 Drawing Sheets

(56) References Cited

U.S. PATENT DOCUMENTS

| | | | |
|---|---|---|---|
| 5,181,321 A * | 1/1993 | Gouttebarge | 30/357 |
| 5,239,160 A | 8/1993 | Sakura et al. | |
| 5,247,923 A | 9/1993 | Lebourg | |
| 5,272,940 A | 12/1993 | Diskin | |
| 5,387,776 A | 2/1995 | Preiser | |
| 5,388,484 A | 2/1995 | Bogner | |
| 5,488,761 A | 2/1996 | Leone | |
| 5,643,523 A | 7/1997 | Simpson | |
| 5,685,671 A | 11/1997 | Packer et al. | |
| 5,722,803 A | 3/1998 | Battaglia et al. | |
| 5,776,355 A | 7/1998 | Martin | |
| 5,853,268 A | 12/1998 | Simpson | |
| 5,906,053 A * | 5/1999 | Turner et al. | 30/347 |
| 5,983,756 A * | 11/1999 | Orloff | 76/104.1 |
| 6,146,476 A | 11/2000 | Boyer | |
| 6,161,990 A | 12/2000 | Oles et al. | |
| 6,315,502 B1 | 11/2001 | Maurer | |
| 6,353,204 B1 | 3/2002 | Spaay et al. | |
| 6,353,205 B1 | 3/2002 | Izard | |
| 6,402,438 B1 | 6/2002 | Boyer | |
| 6,447,560 B2 | 9/2002 | Jensen et al. | |
| 6,521,864 B2 | 2/2003 | Bertez et al. | |
| 6,524,036 B1 | 2/2003 | Kölker | |
| 6,612,204 B1 * | 9/2003 | Droese et al. | 76/104.1 |
| 6,712,564 B1 | 3/2004 | Hughes et al. | |
| 6,733,603 B1 | 5/2004 | Wu et al. | |
| 7,002,100 B2 | 2/2006 | Wu et al. | |
| 7,179,023 B2 | 2/2007 | Goudemond et al. | |
| 7,189,032 B2 | 3/2007 | Goudemond et al. | |
| 7,322,776 B2 | 1/2008 | Webb et al. | |
| 7,432,471 B2 | 10/2008 | Yamazaki et al. | |
| 2004/0112647 A1 | 6/2004 | Meierhofer | |
| 2004/0120777 A1 | 6/2004 | Noland | |
| 2004/0234349 A1 | 11/2004 | Ueda et al. | |
| 2007/0163128 A1 * | 7/2007 | Tarrerias | 30/350 |
| 2007/0212177 A1 | 9/2007 | Liu et al. | |
| 2008/0095968 A1 | 4/2008 | Semon | |
| 2008/0292415 A1 | 11/2008 | Kuroda et al. | |
| 2009/0114628 A1 | 5/2009 | DiGiovanni | |
| 2011/0095005 A1 * | 4/2011 | Brunner et al. | 219/121.69 |

FOREIGN PATENT DOCUMENTS

| | | | | |
|---|---|---|---|---|
| DE | 199 01 777 A1 | 7/2000 | | |
| DE | 19860585 A1 | 7/2000 | | |
| DE | 10 2006 005401 A1 | 8/2007 | | |
| DE | 19901777 B4 | 8/2007 | | |
| DE | 102006005401 A1 | 8/2007 | | |
| EP | 0191203 A2 | 8/1988 | | |
| EP | 1537930 A1 | 6/2005 | | |
| FR | 2866256 A1 * | 8/2005 | | B23P 15/28 |
| JP | 61109606 A | 5/1986 | | |
| JP | S61109606 | 5/1986 | | |
| JP | 06023615 A | 2/1994 | | |
| JP | H0623615 | 2/1994 | | |
| JP | 2008-206133 A | 8/1996 | | |
| JP | 1150254 | 2/1999 | | |
| JP | 2004216483 | 8/2004 | | |
| JP | 2008-062369 A | 3/2008 | | |
| JP | 200852369 | 3/2008 | | |
| JP | 2008062369 | 3/2008 | | |
| JP | 2009006436 | 1/2009 | | |
| JP | 2009006436 A | 1/2009 | | |
| WO | 2007104065 A1 | 9/2007 | | |

OTHER PUBLICATIONS

D. Breitling et al., "Fundamental Aspects in Machining of Metals With Short and Ultrashort Laser Pulses", Proc. of SPIE, vol. 5339, pp. 49-63, Belingham, WA, 2004.

Lasers: Solve Every Task Perfectly, State-Of-The-Art Laser Technology, Trumpf Group, pp. 1-40.

European Patent Office, "extended European search report from corresponding application EP 10 82 5584", Mar. 27, 2015, 6 pp.

Apr. 16, 2015 Search report 2490853.

Jul. 21, 2015 Final Office Action 2012535332.

"Aug. 19, 2014—Rection2".

* cited by examiner

THREE-DIMENSIONAL SURFACE SHAPING OF ROTARY CUTTING TOOL EDGES WITH LASERS

FIELD OF THE INVENTION

The present invention relates to the formation of rotary cutting tool edges, and more particularly relates to the use of a laser to provide three-dimensional surface shaping of such cutting edges.

BACKGROUND INFORMATION

The need in machining to have cutting edges with a hardness greater than the material being machined is well known. Throughout the evolution of tools this has progressed from stone, to bronze, to iron, to carbon steel, to high speed steel, and then to solid carbide. In recent decades this evolution has continued further with the introduction of ceramics (silicon nitride, aluminum oxide, etc.) and "superabrasive" materials such as polycrystalline diamond (PCD) and cubic boron nitride (CBN). Although these materials have greatly enhanced tool life in certain materials by increasing the hardness, wear resistance and resistance to deformation of cutting edges, they have been difficult to apply to a broader spectrum of tools. This has been due to the difficulty in machining these materials themselves, especially with PCD and CBN, as there is no material of greater hardness than PCD to machine them with.

The current processes used to shape these materials are electrical discharge machining (EDM), electrical discharge grinding (EDG), and grinding with wheels containing PCD as the abrasive. These processes all have drawbacks of various sorts, such as poor cutting edge quality (EDM and ECG) and large costs and processing times (grinding). There are also limitations to all of these in that freeform geometries cannot be defined point to point, but rather have to consist of ruled surfaces created by the surface generator (grinding wheel face, wire electrode, etc.).

Lasers have been used to cut various types of materials. For example, U.S. Pat. Nos. 4,481,016; 4,849,602; 5,643,523; and 7,189,032 disclose the use of a laser to cut through a plate of cutting tool material to form several separate cutting tool inserts from the single plate of material. Lasers have also been used to cut through cutting tip portions of cutting tool inserts, for example, as disclosed in U.S. Pat. Nos. 4,714,385; 5,178,645; and 7,322,776, and published U.S. Patent Application No. 2008/029415. In such laser cutting operations, the laser beam slices through the cutting tool insert material in a direction parallel with the plane of the flat surface that is formed by the cutting operation.

Lasers have also been used to roughen the surface of cutting tool inserts in order to improve adhesion of a subsequently applied layer of material, as disclosed in U.S. Pat. Nos. 5,722,803; 5,776,355; and 6,161,990, or to provide a textured surface that helps to hold the cutting tool insert in position when it is mechanically clamped into a cutting machine, as disclosed in U.S. Pat. No. 6,712,564.

Despite these prior methods, a need still exists for a way to efficiently form cutting edges in tools having relatively complex geometries, such as drills and other rotary cutting tools.

SUMMARY OF THE INVENTION

The present invention provides a method for forming the cutting edge and adjacent contoured surface area of rotary cutting tools utilizing a laser to remove material from the cutting end of the tool to create a predetermined point-by-point geometry. Relatively complex surface and edge geometries may be formed by directing a laser beam toward the cutting end of the tool at an angle having a component that is normal to the surface of the cutting end. The laser beam is directed in multiple passes across the surface of the cutting end to remove material and form the desired cutting edge and adjacent three-dimensional contoured surface geometry.

An aspect of the present invention is to provide a method of forming a cutting edge of a rotary cutting tool having a body and at least one flute formed in the body along at least a portion of a length of the body defining a cutting edge adjacent to a cutting end of the tool, the method comprising removing material from the cutting end of the tool with a directed laser beam to thereby form the cutting edge and a predetermined three dimensional contoured surface adjacent to the cutting edge.

Another aspect of the present invention is to provide a rotary cutting tool comprising a body, at least one flute formed in the body along at least a portion of a length of the body defining a cutting edge adjacent to a cutting end of the tool, and a contoured surface adjacent to the cutting edge, wherein the cutting edge and adjacent contoured surface are formed by a laser beam.

These and other aspects of the present invention will be more apparent from the following description.

DETAILED DESCRIPTION OF PREFERRED EMBODIMENT

The laser-shaping method of the present invention may be used to form cutting edges and surrounding contoured surfaces in rotary cutting tools. As used herein, the term "rotary cutting tool" means a rotating tool for chip removal machining. Examples of some types of rotary cutting tools that may be formed by the methods of the present invention include drills and drill bits, milling cutters, reamers, taps, step drills, indexable drills, counterbores, spotfacing tools, orbital tools and the like. The cutting edges of such tools may be made of very hard materials including carbides, cermets such as cemented tungsten carbides, ceramics such as cubic boron nitride or aluminum oxide, polycrystalline diamond and the like.

Figure 1:
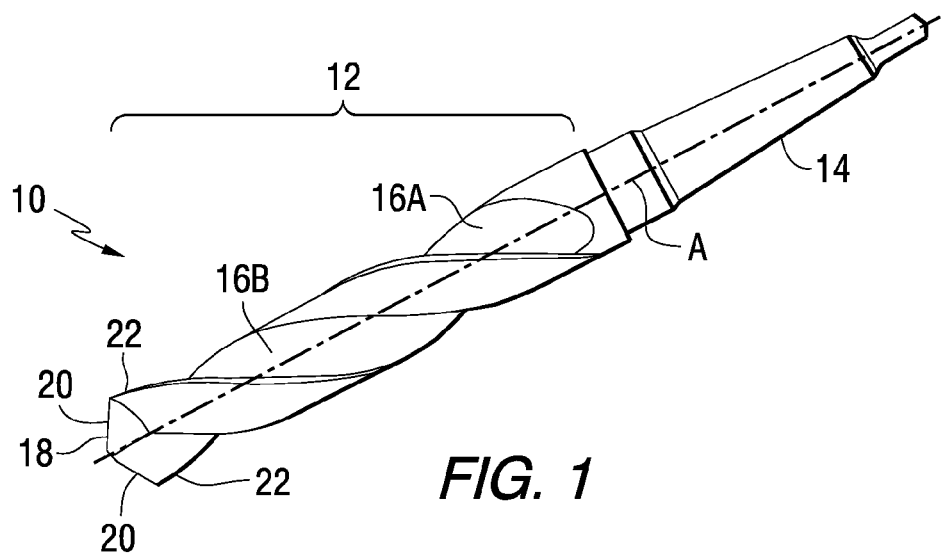
FIG. 1 is an isometric view of a rotary cutting tool in the form of a drill having cutting edges and adjacent three-dimensional contoured surfaces that may be formed by a controlled laser beam in accordance with an embodiment of the present invention.
Figure 2:
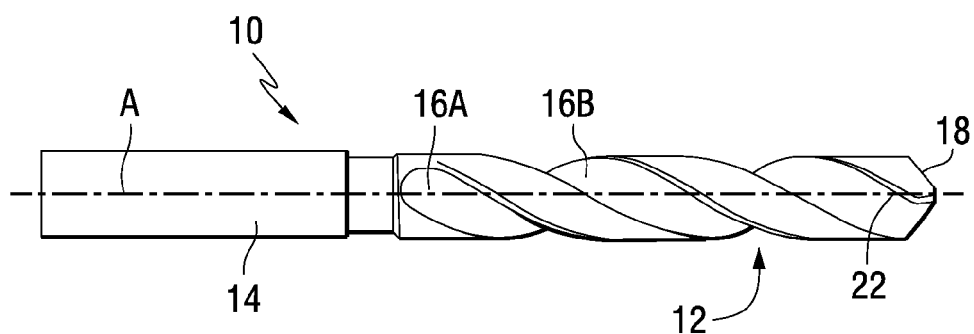
FIG. 2 is a side view of a drill similar to that shown in FIG. 1.
Figure 3:
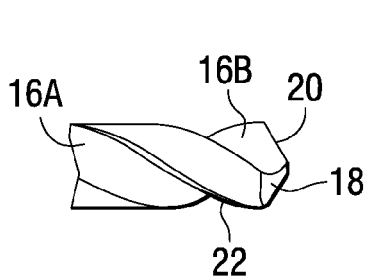
FIG. 3 is a side view of a portion of the drill shown in FIG. 2, with the tool rotated 90 degrees around its longitudinal axis from the position shown in FIG. 2.
Figure 4:
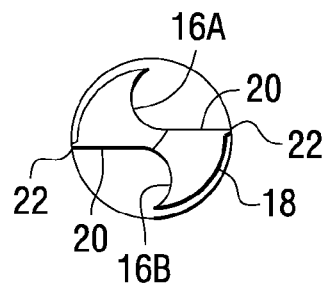
FIG. 4 is an end view of the drill of FIG. 2.

FIGS. 1-4 illustrate drills that may be fabricated in accordance with the present invention. However, it is understood that any other type of rotary cutting tool having similar types of cutting edge geometries are considered to be within the scope of the present invention. As shown in FIGS. 1 and 2, the drills 10 have body 12 and shank portions 14 aligned along a longitudinal axis of rotation A. The body comprises at least one flute 16A, 16B miming along at least a portion of the axial length of the body 12. In the embodiments shown in FIGS. 1 and 2, the drills include two helical flutes 16A and 16B. However, the rotary cutting tools may have any other suitable number of flutes, and may have any other known type of flute geometry.

In accordance with the present invention, the cutting edges of the rotary cutting tools 10 and their adjacent contoured surface areas are formed into the desired shape by laser irradiation which removes material from the cutting end of the tool 10 on a controlled point-by-point basis. In the embodiments shown in FIGS. 1-4, the drills 10 have substantially conical cutting tips 18 which define major cutting edges 20 in the regions where the helical flutes 16A and 16B intersect the tips 18. In addition, the drills 10 have minor cutting edges 22 in the regions where the helical flutes radially intersect the outer periphery of the generally cylindrical bodies. The major cutting edges 20 and/or minor cutting edges 22, as well as their adjacent contoured surfaces, may be formed with a laser beam in accordance with the present invention.

Figure 5:
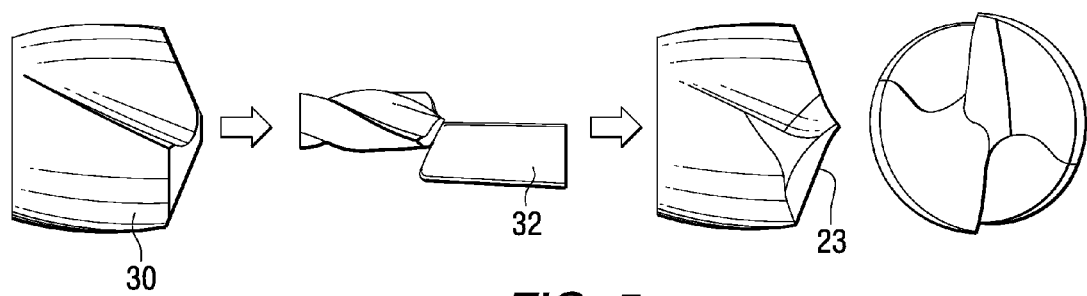
FIG. 5 illustrates a conventional grinding process for forming the cutting end of a drill.

FIG. 5 illustrates a conventional grinding method for shaping the cutting end of a drill. A pre-machined rod 30 with helical flutes formed therein is machined with a grinding wheel 32 to form the desired shape 34 at the cutting end of the drill. While such a conventional grinding process may be suitable for certain types of drill materials, the grinding method may not be practical for drills made of very hard materials such as carbides, cermets, ceramics, PCD, CBN and combinations of such materials.

Figure 6:
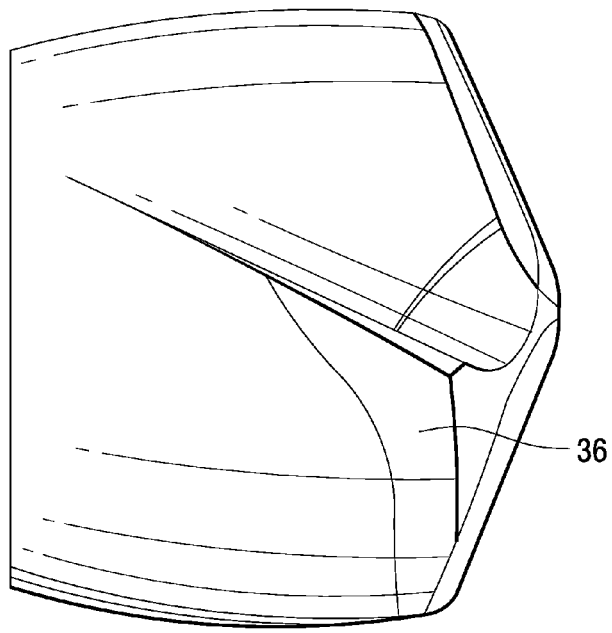
FIG. 6 illustrates the material that is removed from the cutting end of a drill during the grinding process as shown in FIG. 5.

FIG. 6 illustrates the volume of material 36 that is removed from the cutting end of the drill during the grinding process illustrated in FIG. 5. In order to obtain the desired shape, a significant amount of material must be removed from the tip of the drill, as well as from the side peripheral surfaces of the drill body adjacent to the trailing edge of each helical flute. The removal of such large amounts of material from drills made of very hard materials may be difficult or impossible.

Figure 7:
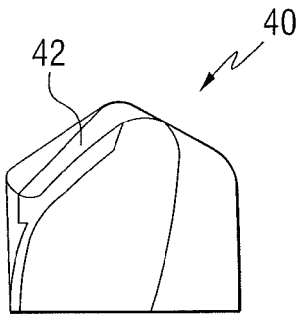
FIG. 7 illustrates the cutting end of a rotary cutting tool, indicating the region that is subjected to laser treatment in accordance with an embodiment of the present invention and another region away from the cutting tip that is machined by conventional grinding.
Figure 8:
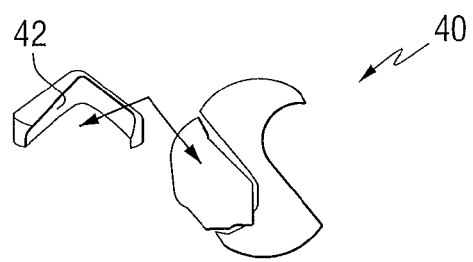
FIG. 8 is an exploded end view of the rotary cutting tool shown in FIG. 7.

FIG. 7 illustrates the cutting end of a rotary cutting tool 40, indicating the region 42 that is subjected to laser treatment in accordance with an embodiment of the present invention. Another region away from the cutting tip may be machined in a conventional manner such as grinding. FIG. 8 is an exploded end view of the rotary cutting tool 40 shown in FIG. 7.

Figure 9:
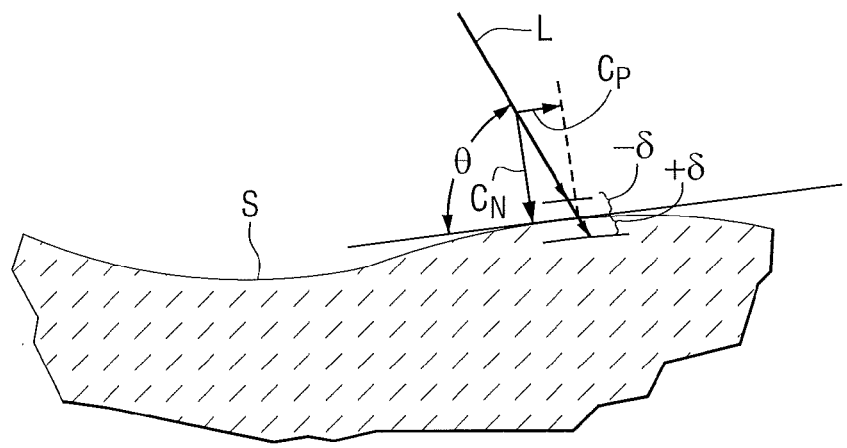
FIG. 9 is a partially schematic illustration of a laser shaping operation of the present invention in which the laser beam is directed toward the surface of a rotary cutting tool at an angle measured from the shaped surface of the tool.

FIG. 9 is a partially schematic illustration of a laser shaping operation of the present invention in which the laser beam L is directed toward the surface S of a rotary cutting tool at an angle $\Theta$ measured from the shaped surface S of the tool. The angle $\Theta$ has a component $C_N$ that is normal to the shaped surface S of the tool, and a component $C_p$ that is parallel to the shaped surface S of the tool. As the laser beam L moves across the surface S, the angle $\Theta$ typically changes due in part to the contour of the shaped surface S, while maintaining a component that is normal to the surface S. In one embodiment, the angle $\Theta$ has a nominal value of 90°±45°, for example, 90°±30°. In particular embodiments, the angle $\Theta$ may be 90°±10° or 90°±5°. The focal point of the laser may be controlled. For example, the focal point may be located at the surface of the workpiece, or may be located a selected distance above the surface $-\delta$, or a selected distance below the surface $+\delta$, as shown in FIG. 9.

Figure 10:
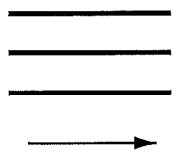
FIG. 10 is a partially schematic illustration of a laser beam path across the surface of the cutting end of a rotary cutting tool in which the laser beam is directed in multiple parallel passes across the surface in which each adjacent pass is made in the same direction.

FIG. 10 is a partially schematic illustration of a laser beam path across the surface of the cutting end of a rotary cutting tool in which the laser beam is directed in multiple parallel passes across the surface in which each adjacent pass is made in the same direction.

Figure 11:
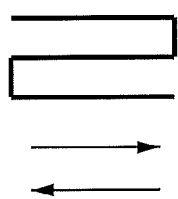
FIG. 11 is a partially schematic illustration of a laser beam path across the surface of the cutting end of a rotary cutting tool in which the laser beam is directed in multiple parallel passes across the surface in which each adjacent pass is made in opposite directions.

FIG. 11 is a partially schematic illustration of a laser beam path across the surface of the cutting end of a rotary cutting tool in which the laser beam is directed in multiple parallel passes across the surface in which each adjacent pass is made in opposite directions.

Figure 12:
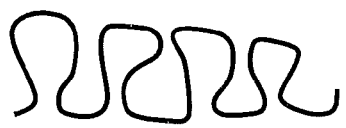
FIG. 12 illustrates a free-form laser beam pattern across the surface of the cutting end of a rotary cutting tool in accordance with another embodiment of the present invention.

FIG. 12 illustrates a free-form laser beam pattern across the surface of the cutting end of a rotary cutting tool in accordance with another embodiment of the present invention.

As shown in FIGS. 10-12, the laser beam travels across the surface of the workpiece in various controlled patterns in order to remove or ablate the cutting tool material on a controlled point-by-point basis in order to form the cutting edges and surrounding surface areas.

Figure 13:
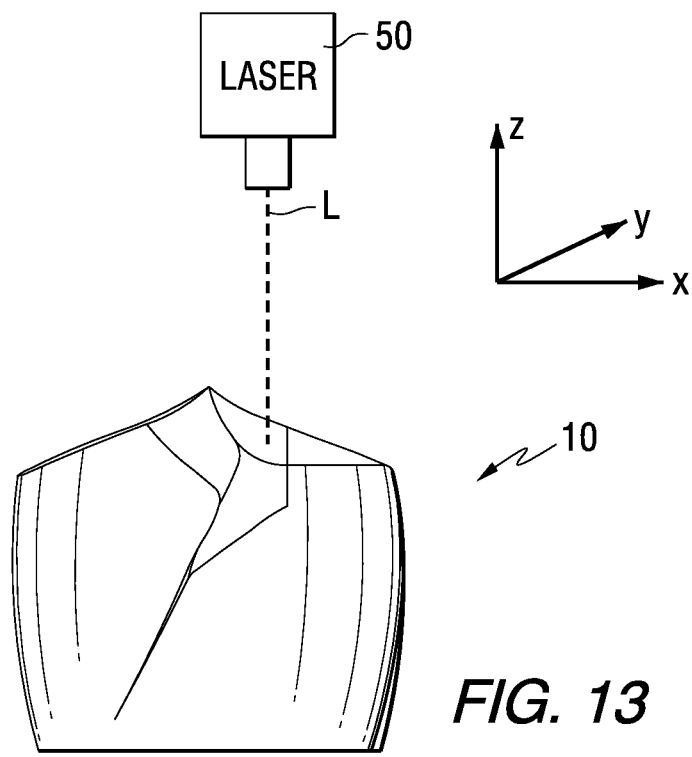
FIG. 13 illustrates the relative positions of a laser and the cutting end of a rotary cutting tool during laser treatment in accordance with an embodiment of the present invention.

FIG. 13 illustrates the relative positions of a laser 50 and the cutting end of a rotary cutting tool 10 during irradiation with a laser beam L in accordance with an embodiment of the present invention. In accordance with the present invention, the laser L ablates or evaporates material from the cutting tip portion of the drill 10 or other tool to create the desired geometry point-by-point. The creation of single or multiple edges in freeform design is possible with the method of the present invention. In accordance with an embodiment of the invention, after the cutting edge(s) and adjacent surfaces are created, the rest of the tool may be manufactured by grinding, milling, EDM/ECG, further laser evaporation, or a combination of such methods. The mounting method of a dissimilar cutting edge material (such as PCD in a solid carbide body) could be done by brazing, shrink-fitting, co-sintering, or by other known fastening methods.

The lasers used in accordance with the present invention may comprise, for example, conventional diode pumped solid state lasers such as Nd:YVO$_4$ lasers, Nd:YAG lasers, and the like. The pulse frequency and power of the laser may be adjusted as desired. For example, pulse frequencies of from 100 to 10,000 kHz may be suitable, and powers of from 1 to 500 W may be suitable. The laser is located a suitable distance away from the surface of the workpiece, e.g., from 1 to 100 cm.

Relative movement of the laser beam and the cutting tool workpiece may be achieved by linear and/or rotary positioning of the tool, e.g., by moving a table or other fixture upon which the tool is mounted in multiple axes, such as 3, 4 or 5 axes of movement. Furthermore, the laser beam may be moved, e.g., by mirrors and/or by translational or rotational movement of the laser in multiple axes. The laser beam may travel across the surface of the workpiece at any desired speed, typically from 1 to 10,000 mm/second, for example, from 10 to 1,000 mm/second. The size of the laser spot on the workpiece may be controlled as desired, e.g., the diameter of the laser spot may typically be from 1 to 100 microns. A feedback system may be used to control the laser ablation process. Alternatively, an open loop system may be used, with workpiece detection done first followed by laser ablation.

In accordance with an embodiment of the present invention, the cutting edge and adjacent surface area of the workpiece may be detected in order to guide and control the laser beam. For example, the cutting edge of the rotary cutting tool workpiece may be detected by an optical device such as a laser source, or by backscattering of the laser. Mechanical locating devices may also be used. In addition to detection of the cutting edge, the system may detect the geometry of the adjacent surface as material is removed from the surface by the laser beam in order to monitor and control the laser shaping operation.

Figure 14:
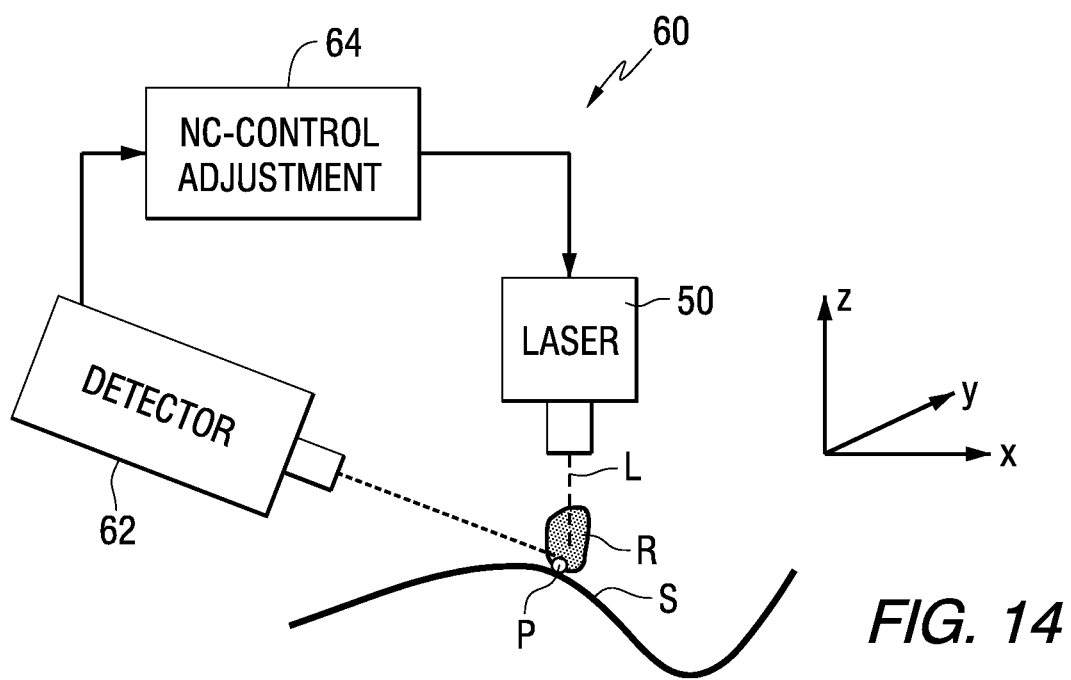
FIG. 14 schematically illustrates a laser beam control system that may be used in accordance with an embodiment of the present invention.

FIG. 14 schematically illustrates a laser beam control system 60 that may be used in accordance with an embodiment of the present invention. The laser beam L is directed from the laser 50 toward the surface S of the cutting tool 10 to create a plasma point P and a plasma region R during the ablation process. In the embodiment shown in FIG. 14, a single laser 50 is used. A detector 62 may be used to locate the three-dimensional position of the plasma point P in relation to the cutting tool 10. An output signal from the detector 62 may be fed to a controller 64, which, in turn, controls the laser 50. During the process, adaptive control of the laser beam may be accomplished by means of adjusting various parameters of the laser including the pulse frequency, laser power, pulse sequence, translational speed across the surface, pattern of movement, focal depth and the like. The detector 62 may include a laser source or other optical device conventionally used for surface measurements, such as those found in laser eye surgery or three-dimensional sheet metal laser welding.

After the laser irradiation process, the resultant shaped surface may be very smooth with a typical surface roughness of less than 0.5 micron Ra, for example, from 0.01 to 0.2 micron Ra. In certain embodiments, the surface roughness is less than 0.1 or 0.05 Ra.

In accordance with an embodiment of the present invention, the cutting edge formed by the laser beam has sufficient sharpness for the intended use of the rotary cutting tool, without the necessity of any additional honing or machining. The cutting edge formed by the laser beam may have an edge sharpness of less than 130 microns, for example, less than 100 or 50 microns. In certain embodiments, the edge sharpness may be less than 10 microns or even less than 1 micron.

When forming a rotary cutting tool such as drills, the relatively complex contoured surfaces formed by the laser beam may include concave portions, convex portions, and combinations thereof. For example, in the region of the flute, at least a portion of the shaped surface is concave. For a typical helical flute, the shaped surface is inwardly curved in a plane perpendicular to the axis of the drill, and is helical along the length of the drill. In contrast with the concave flute surface, the laser-shaped surface at the tip of the drill may be convex, with an outwardly curved surface corresponding to a conical segment. In the embodiments shown in FIGS. 1-4, 7 and 8, the laser-shaped cutting edges are in the form of straight lines at the intersections of the substantially conical tip and helical flutes.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method of forming a cutting edge of a rotary cutting tool having a body and at least two flutes formed in the body along at least a portion of a length of the body defining at least two cutting edges adjacent to a cutting end of the tool, the method comprising:
   removing material from the cutting end of the tool with a directed laser beam to thereby form the cutting edge and a predetermined three dimensional contoured shaped surface adjacent to the cutting edge,
   wherein the laser beam is directed toward the cutting end of the tool at an angle having a component that is normal to the shaped surface of the cutting end when the laser beam forms the shaped surface.

2. The method of claim 1, wherein the angle of the laser beam is 90±10° measured from a plane parallel with the shaped surface.

3. The method of claim 1, wherein the laser beam is directed in multiple passes across the surface of the cutting end.

4. The method of claim 3, wherein at least some of the multiple passes are parallel with each other.

5. The method of claim 4, wherein the parallel passes adjacent to each other made in the same direction.

6. The method of claim 4, wherein the parallel passes adjacent to each other are made in opposite directions.

7. The method of claim 1, wherein the rotary cutting tool is a drill.

8. The method of claim 1, wherein at least one of the flutes is helical.

9. The method of claim 1, wherein the cutting end of the tool is substantially conical.

10. The method of claim 1, wherein the contoured surface formed by the laser beam comprises a concave portion.

11. The method of claim 1, wherein the contoured surface formed by the laser beam comprises a concave portion on one side of the cutting edge and a convex portion on another side of the cutting edge.

12. The method of claim 11, wherein the concave portion comprises a substantially helical shape and the convex portion comprises a substantially conical shape.

13. The method of claim 1, wherein the contoured surface formed by the laser beam as a surface roughness of less than 0.2 micron Ra.

14. The method of claim 1, wherein the laser beam is pulsed.

15. The method of claim 1, further comprising machining another portion of the rotary cutting tool located at a position away from the cutting edge.

16. The method of claim 15, wherein the machining step is performed before the laser beam step.

17. The method of claim 15, wherein the machining step is performed after the laser beam step.

18. The method of claim 1, wherein the cutting end and the body of the rotary cutting tool are integrally formed together when the laser beam is directed at the cutting end.

19. The method of claim 1, wherein the cutting end is separate from the body of the rotary cutting tool when the laser beam is directed at the cutting end and is subsequently secured to the body.

20. The method of claim 1, wherein the cutting end of the rotary cutting tool comprises a ceramic, carbide, cermet or a combination thereof.

21. The method of claim 1, wherein the cutting end of the rotary cutting tool comprises polycrystalline diamond, cubic boron nitride or a combination thereof.

22. The method of claim 1, wherein the body of the rotary cutting tool comprises steel.

23. A rotary cutting tool made by the method of claim 1.

24. A method of forming a cutting edge of a rotary cutting tool having a body and at least one flute formed in the body along at least a portion of a length of the body defining a cutting edge adjacent to a cutting end of the tool, the method comprising:
    removing material from the cutting end of the tool with a directed laser beam to thereby form the cutting edge and a predetermined three dimensional contoured shaped surface adjacent to the cutting edge,
    wherein the laser beam is directed toward the cutting end of the tool at an angle having a component that is normal to the shaped surface of the cutting end when the laser beam forms the shaped surface; and
    wherein the contoured surface formed by the laser beam has a surface roughness of less than 0.2 micron Ra.

25. A method of forming a cutting edge of a rotary cutting tool having a body and at least one flute formed in the body along at least a portion of a length of the body defining a cutting edge adjacent to a cutting end of the tool, the method comprising:
    removing material from the cutting end of the tool with a directed laser beam to thereby form the cutting edge and a predetermined three dimensional contoured shaped surface adjacent to the cutting edge,
    wherein the laser beam is directed toward the cutting end of the tool at an angle having a component that is normal to the shaped surface of the cutting end when the laser beam forms the shaped surface; and
    wherein the cutting end is separate from the body of the rotary cutting tool when the laser beam is directed at the cutting end and is subsequently secured to the body.

26. A method of forming a cutting edge of a rotary cutting tool having a body and at least one flute formed in the body along at least a portion of a length of the body defining a cutting edge adjacent to a cutting end of the tool, the method comprising:
    removing material from the cutting end of the tool with a directed laser beam to thereby form the cutting edge and a predetermined three dimensional contoured shaped surface adjacent to the cutting edge,
    wherein the laser beam is directed toward the cutting end of the tool at an angle having a component that is normal to the shaped surface of the cutting end when the laser beam forms the shaped surface; and
    wherein the contoured surface formed by the laser beam comprises a concave portion on one side of the cutting edge and a convex portion on another side of the cutting edge.

27. The method of claim 26, wherein the concave portion comprises a substantially helical shape and the convex portion comprises a substantially conical shape.

* * * * *